UNITED STATES PATENT OFFICE.

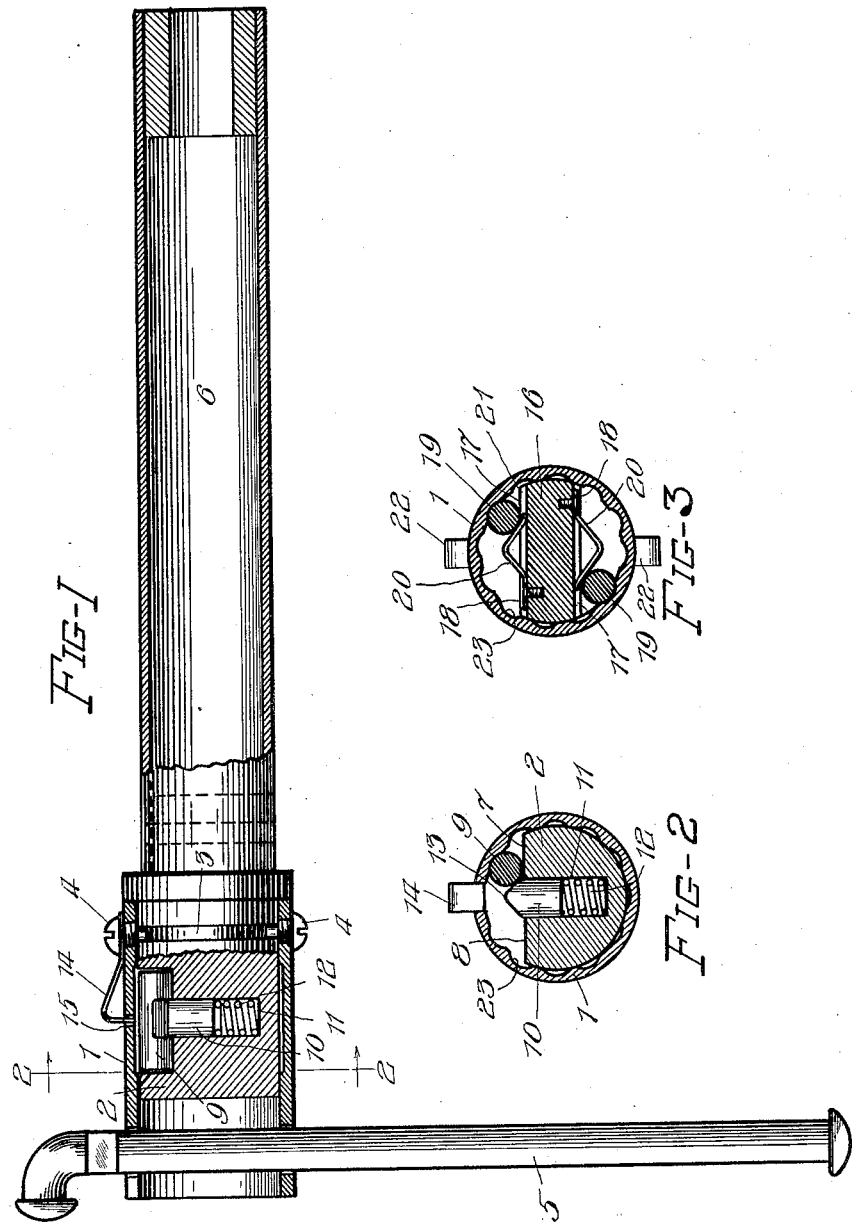

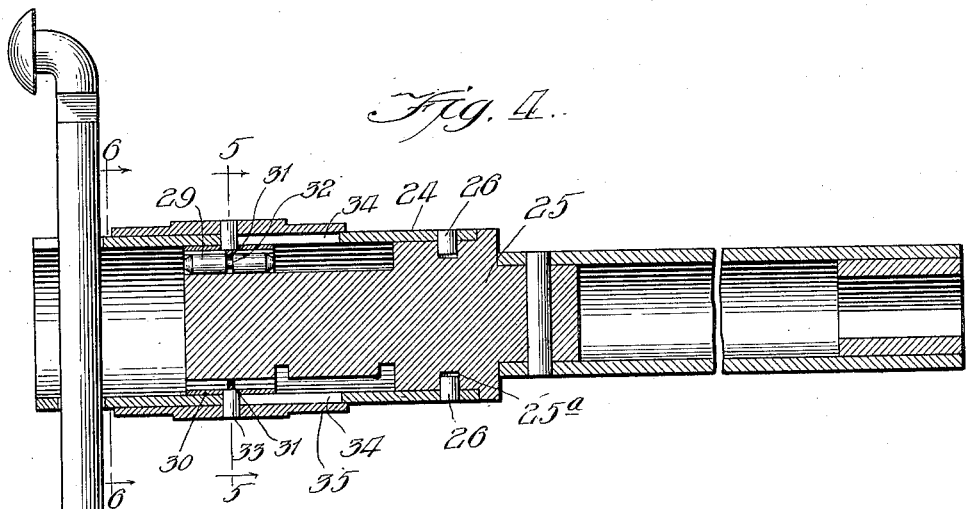
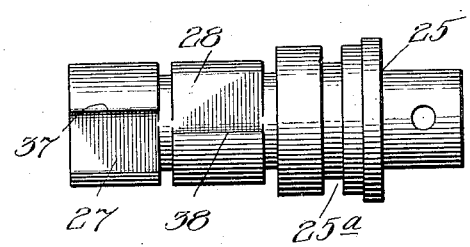
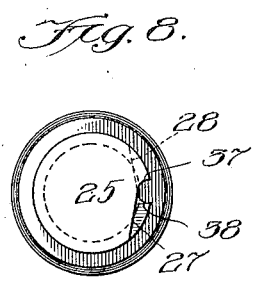
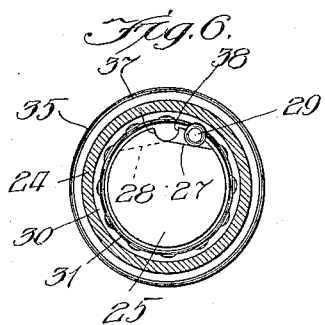
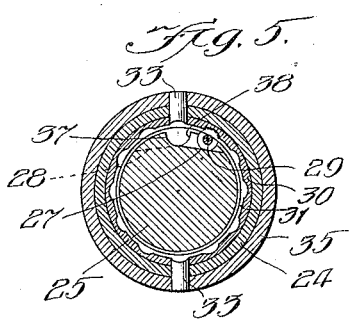

EBEN R. PACKER, OF CHICAGO, ILLINOIS, ASSIGNOR TO PACKER AUTO SPECIALTY COMPANY, A CORPORATION OF ILLINOIS.

ROLLER CLUTCH DEVICE.

1,057,495. Specification of Letters Patent. Patented Apr. 1, 1913.

Application filed May 1, 1911, Serial No. 624,380. Renewed June 12, 1912. Serial No. 703,326.

*To all whom it may concern:*

Be it known that I, EBEN R. PACKER, a citizen of the United States, residing at Chicago, county of Cook, State of Illinois, have invented a certain new and useful Improvement in Roller Clutch Devices, and declare the following to be a full, clear, and exact description of the same, such as will enable others skilled in the art to which it pertains to make and use the same, reference being had to the accompanying drawings, which form a part of this specification.

My invention has for its object to produce a simple and novel clutch device which will permit two members to be rotated together in either direction or be rotated relative to each other.

A further object of my invention is to produce a tool composed of a few simple parts, compactly arranged, which may be rotated step by step in either direction.

A further object of my invention is to produce a roller clutch in which a single roller may be employed for the purpose of producing a driving connection in either direction or permitting the two connected members to be rotated independently of each other in either direction.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a longitudinal central section through a wrench arranged in accordance with a preferred form of my invention; Fig. 2 is a section on line 2—2 of Fig. 1; Fig. 3 is a view similar to Fig. 2 showing a modification; Fig. 4 is a view similar to Fig. 1 showing a still further modification; Fig. 5 is a section on line 5—5 of Fig. 4; Fig. 6 is a section on line 6—6 of Fig. 4; Fig. 7 is an elevation of the driven member of the wrench shown in Fig. 4; and Fig. 8 is a view looking toward the left in Fig. 7.

In the drawings I have illustrated my invention only as applied to a wrench and I shall, for the sake of brevity, confine the detailed description to this particular use of my invention; but I desire to have it understood that my invention is not limited in its use to wrenches or even to what is commonly known as "tools", since it is applicable in many situations where it is desirable to connect together a driving member and a driven member so that a rotary movement in either direction may be produced in one member by an oscillatory movement of the other member, or where it is desired to clutch the two members together for movement in one direction and leave them free for independent movement in the opposite direction.

Referring to Figs. 1 and 2 of the drawings, 1 represents a tubular driving member into which extends a driven member 2, the driven member being preferably cylindrical and fitting within the driving member so as to be free to rotate therein. The members 1 and 2 are preferably connected together so as to hold them against relative axial movements. This may conveniently be accomplished by providing the driven member with an annular peripheral groove 3 into which extend screws or pins 4 carried by the outer member. The driving member, in the case of a wrench or other tool, may be provided with a handle 5 for turning the same; and the driven member may be provided with a suitable shank 6 which serves as the tool or as the holder for a tool. The member 2 has portions cut away on one side so as to form two clutch faces 7 and 8, respectively, which lie on opposite sides of a plane containing the axis of rotation. In the arrangement shown in Figs. 1 and 2 the two clutch faces lie side by side and they may therefore be formed conveniently by cutting a channel across one side of the driven member. In the chamber formed between the two clutch faces and the overlying portion of the driving member, I arrange a roller 9 which lies parallel with the axis of rotation and serves to clutch the driving member and the driven member together under certain conditions. When the roller lies upon the clutch face 7, as indicated in Fig. 2, a clockwise movement of the driving member will cause the roller to bind between the clutch face on the driven member and the driving member, thus connecting the two members together so that they will rotate as one. If the driving member be rotated in the opposite direction, the roller will turn backward and so disconnect the driving member from the driven member. When the roller lies upon the other clutch face, then a counter-clockwise movement of the driving member causes the driven member to be connected thereto and rotate therewith, while a clockwise rotation releases the two members from each other. It will thus be seen that by keeping the roller always on one clutch face or the other, a step by step rotation of the driven member may be produced in either direction (depending upon which of the clutch faces is in action) by simply oscillating the driving member.

In accordance with my invention I provide means for normally maintaining the roller upon one clutch face or the other and for permitting the roller to be shifted whenever desired. To this end I have provided the driven member with a radially-yieldable stop lying between the two clutch faces and adapted to project above the clutch faces sufficiently to prevent the roller from rolling from one face to the other under a backward movement of the driving member. This stop may conveniently consist of a plug or plunger 10 slidably mounted in a socket 11 extending into the driven member from the plane of the clutch faces, the plug or plunger being pressed outwardly beyond the plane of the clutch faces by means of a spring 12 lying beneath it in the socket. The outer end of the plug or plunger is preferably tapered as indicated at 13. The parts are so proportioned that normally the plunger is forced out far enough to cause its tapered end to engage with the roller and press it toward its working position with sufficient force to hold it against rattling. When the driving member is moved backward, the roller simply rolls on the pointed end of the plunger but does not depress it sufficiently to pass beyond the same. Consequently when the parts are in the positions indicated in Fig. 2, the driven member may be rotated step by step in the clockwise direction through an oscillatory movement of the driving member, without fear that the roller will fall over to the other clutch face in any angular position of the tool. When it is desired to shift the roller to the other clutch face it is only necessary to press it laterally with sufficient force to cause the plunger or plug to be depressed far enough to leave room above it for the passage of the roller. Then, as soon as the roller has passed to the other clutch face, the plunger springs out and yieldingly locks it in its new position. The shifting of the roller from one clutch face to the other may conveniently be accomplished by providing the driving member with a pin which may be pushed in far enough to engage with the side of the roller when the driving member is turned backward and drive the roller across the pin. In the arrangement shown the plunger shifting device consists of the simple spring finger 14 which may be held in place by one of the screws 4 so as to project into a slot 15 in the driving member. Assuming that it is desired to shift the roller from the clutch face 7 to the clutch face 8: the spring finger is pressed inwardly and the driving member is given a complete turn in the counter-clockwise direction, as viewed in Fig. 2, the finger striking the roller toward the end of this movement and forcing it against the incline on the end of the plunger or plug and thereby causing the latter to be depressed sufficiently to permit the roller to pass to the other side.

In Fig. 3 I have shown a slight modification in which the driven member 16 is provided with two sets of clutch faces 17 and 18, each corresponding to the clutch faces 7 and 8 in the first form of my invention. This is perhaps a stronger construction since it is in effect a double clutch. The stops or holding members for the rollers 19 are in the form of bent spring fingers 20 each of which is secured at one end in a groove 21 extending transversely across the clutch faces. The bend in the spring fingers performs the same function as the pointed end of the plunger in the other form of my invention. In this arrangement two shifting devices 22, corresponding to the member 14 in the other arrangement, must be provided; these shifting devices being so arranged that they will simultaneously engage with their corresponding rollers for the purpose of shifting them.

The interior of the driving member in the form of my invention shown in Figs. 2 and 3 may be smooth, but I prefer to provide a series of longitudinal grooves 23 distributed about the interior of the driving member so as to provide seats which give the roller or rollers a firmer hold.

In Figs. 4 to 8 I have shown another form of my invention, the principal difference between this and the forms heretofore described consisting in displacing the two clutch faces on the driven member relative to each other longitudinally of the axis of rotation. The roller is shifted from one clutch face to the other by sliding it longitudinally. Referring to these figures, 24 represents a tubular driving member and 25 a driven member extending into and revoluble in the driving member. Relative axial movements are prevented by means of a pin 26 extending from the driving member into a groove 25$^a$ in the driven member. The driven member is flattened on one side to a point slightly beyond the plane extending at right angles to the flattened portion and containing the axis of the driven member so as to produce a clutch face 27. Beyond one end of the flattened portion 27 is a similar flattened portion 28 which is oppositely located with respect to the clutch face 27. By this arrangement, two clutch faces lying end to end and partially overlapping at the center, are produced. The overlapping of the clutch faces is sufficient to permit a roller 29, corresponding to the rollers 9 and 19 in the other forms of my invention, to be slid lengthwise from one clutch face to the other. The roller does not engage directly with the driving member but lies within a ring 30 which lies between the roller and the driving member and has a sliding fit in the latter. Projecting inwardly from the ring between the ends thereof is an annular flange or rib 31 which extends into an annular groove 32 surrounding the roller and thus prevents relative endwise movements between the roller and the ring. The ring is prevented from turning in the driving member by means of pins 33 which extend from the ring through elongated longitudinal slots 34 in the driving member. The outer ends of the pins 33 may conveniently extend into a sleeve 35 which surrounds and has a sliding fit on the driving member. It will be seen that by moving the sleeve longitudinally, the ring and the roller move with it so that when the parts are turned so as to bring the roller into alinement with the overlapping portions of the clutch faces, the roller may be shifted from one clutch face to the other by simply sliding the sleeve longitudinally on the driving member.

In Figs. 4 and 5 the roller is shown in engagement with the clutch face 27. Consequently a clockwise movement of the driving member, as viewed in Fig. 5, will produce a simultaneous movement of the driven member. When the driving member is turned in the counterclockwise direction, the roller rolls backward and the driving member is freed from the driven member. When it is desired to bring the other clutch face into play, the driving member is turned until the roller is brought to the center, and then the sleeve may be moved longitudinally so as to carry the roller into engagement with the other clutch face.

By moving the sleeve 35 to an intermediate position, bringing the roller partly on the clutch face 27 and partly on the clutch face 28, the roller abuts against the radial shoulders 37 and 38 at the inner ends of the clutch faces 27 and 28, respectively, and locks the driving member and the driven member together against relative rotary movements in either direction.

While I have illustrated only a few preferred forms of my invention as applied to a tool and have described them with considerable particularity, I do not desire to limit myself to specific structural details or to a device intended for only use as a tool; but intend to cover all forms and arrangements which fall within the terms employed in the definitions of my invention constituting the appended claims.

I claim:

1. In combination, a tubular driving member, a driven member extending into and revoluble in the driving member, said driven member having portions cut away to form two clutch faces lying side by side on opposite sides of a plane containing the axis of rotation, a roller lying within the chamber formed between said faces and the overlying portion of the driving member, a radially-yieldable device on said driven member between said faces for normally preventing the roller from passing from one face to the other, and means associated with the driving member for forcing the roller past said yieldable member.

2. In combination, a tubular driving member, a driven member extending into and revoluble in the driving member, said driven member having portions cut away to form two clutch faces lying side by side on opposite sides of a plane containing the axis of rotation, a roller lying within the chamber formed between said clutch faces and the overlying portion of the driving member, a radially yieldable device on said driven member between said clutch faces for normally preventing the roller from passing from one clutch face to the other, and a member mounted on the driving member and adapted to be moved inwardly so as to engage the roller and force the roller past said yieldable member upon a relative movement between said members.

3. In combination, a tubular driving member, a driven member extending into and revoluble in the driving member, said driven member having portions cut away to form two clutch faces lying side by side on opposite sides of a plane containing the axis of rotation, a roller lying within the chamber formed between said faces and the overlying portion of the driving member, a yieldable device on said driven member between said faces for normally preventing the roller from passing from one face to the other, and means associated with the driving member for forcing the roller past said yieldable member.

4. In combination, a tubular driving member, a driven member extending into and revoluble in the driving member, said driven member having portions cut away to form two clutch faces lying side by side on opposite sides of a plane containing the axis of rotation, a roller lying within the chamber formed between said faces and the overlying portion of the driving member, a yieldable device on said driven member between said faces for normally preventing the roller from passing from one face to the other, and a device carried by one of said members for forcing the roller past said yieldable member.

5. In combination, a driving member and a driven member, one of said members being tubular and surrounding the other, the inner member having portions cut away to form two clutch faces lying on opposite sides of a plane containing the axis of rotation, a movable clutch element lying within the chamber formed between said faces and the overlying portion of the outer member, a yieldable device on the inner member between said faces for normally preventing the movable clutch element from passing from one fact to the other, and a device carried by one of said members for forcing said clutch element past said yieldable member.

6. In combination, a tubular driving member, a driven member extending into and revoluble in the driving member, said driven member having portions cut away so as to form with the overlying part of the driving member a chamber, a clutch element lying within said chamber and having two positions in one of which a driving connection between said members is effected for rotation in one direction, while in the other position a driving connection is effected between said members for rotation in opposite direction, and a member movable with the driving member for shifting said clutch element from either position into the other.

7. In combination, a tubular driving member, a driven member extending into and revoluble in the driving member, said driven member having portions cut away to form with the overlying part of the driving member a chamber, a clutch element lying within said chamber and having two positions in one of which a driving connection between said members is effected for rotation in one direction, while in the other position a driving connection is effected between said members for rotation in the opposite direction, a yieldable barrier carried by the driven member and lying in the path of said clutch element as it moves from either of its positions to the other, and a device carried by one of said members for forcing said clutch element past said barrier.

In testimony whereof, I sign this specification in the presence of two witnesses.

EBEN R. PACKER.

Witnesses:
WM. F. FREUDENREICH,
RUBY V. BRYDGES.

---

Copies of this patent may be obtained for five cents each, by addressing the "Commissioner of Patents, Washington, D. C."